United States Patent [19]

Hayashi

[11] Patent Number: 4,952,770
[45] Date of Patent: Aug. 28, 1990

[54] LASER-BEAM PROCESSING METHOD AND SYSTEM

[75] Inventor: Seiichi Hayashi, Ishikawa, Japan

[73] Assignee: Kabushiki Kaisha Komatsu Seisakusho, Tokyo, Japan

[21] Appl. No.: 362,431

[22] PCT Filed: Dec. 1, 1987

[86] PCT No.: PCT/JP87/00933

§ 371 Date: Jun. 1, 1989

§ 102(e) Date: Jun. 1, 1989

[87] PCT Pub. No.: WO88/04214

PCT Pub. Date: Jun. 16, 1988

[30] Foreign Application Priority Data

Dec. 1, 1986 [JP] Japan ............................ 61-286488

[51] Int. Cl.$^5$ ............................................. B23K 26/00
[52] U.S. Cl. ........................ 219/121.67; 219/121.77; 219/121.72; 219/121.84; 219/121.78; 219/121.82

[58] Field of Search .................. 219/121.61, 121.62, 219/121.67, 121.72, 121.83, 121.84, 121.77, 121.78, 121.82, 121.8

[56] References Cited

U.S. PATENT DOCUMENTS 4,550,240 10/1985 Toida et al. ................. 219/121.78 X
4,720,621 1/1988 Langen ...................... 219/121.62 X
4,774,393 9/1988 Tarumoto et al. .......... 219/121.85 X Primary Examiner—C. L. Albritton
Attorney, Agent, or Firm—Diller, Ramik & Wight

[57] ABSTRACT

In the present invention, a laser beam is converged upon or in the vicinity of the rear surface of a material to be processed and the pressure of an assist gas is set to be higher than a conventional assist gas pressure. Further, part of the laser beam reflected on the material is extracted through a beam splitter so that, when the level of the extracted laser beam part exceeds a predetermined value, the power of the irradiation laser beam is reduced or the movement of the material relative to the laser beam is stopped.

10 Claims, 3 Drawing Sheets

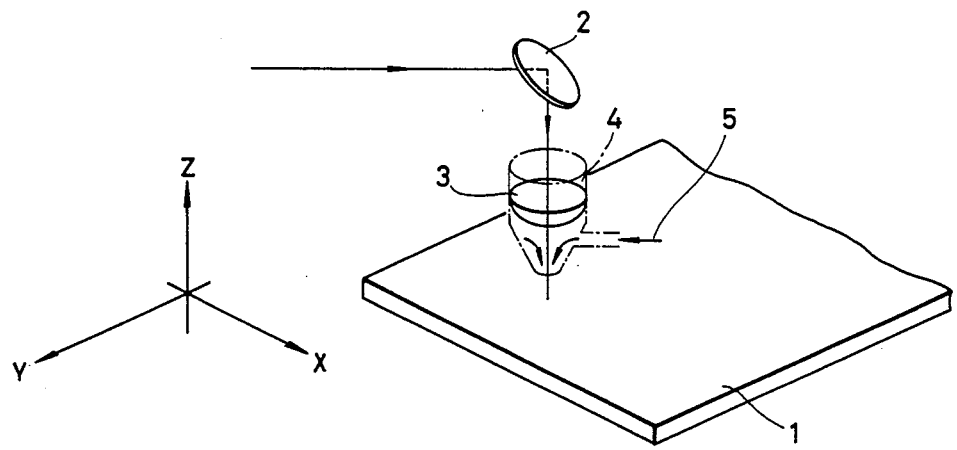
FIG.1
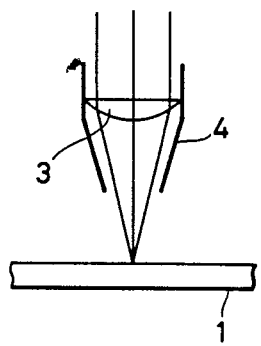 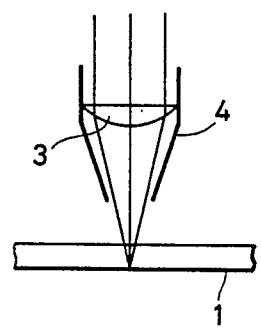
FIG.2(a)     FIG.2(b)

LASER-BEAM PROCESSING METHOD AND SYSTEM

TECHNICAL FIELD

The present invention relates to processing methods and systems using laser beam and, more particularly, to a processing method and system which are suitable to cut materials having high melting points and high reflection factors with use of a suitable laser beam.

BACKGROUND ART

When it is desired to cut a steel plate or the like with use of a laser-beam processing machine, it has been conventionally common practice to converge a laser beam upon or in the vicinity of the front surface of a material to be cut and to set the pressure of an assist gas at such a relatively low level that does not exceed 6 $Kg/cm^2$.

In the case of cutting the steel plate or the like using the conventional laser-beam processing apparatus, there has not occured no special problem; whereas, in the case of cutting such a material having a high melting point and a high relfection factor as aluminum or copper using the same apparatus, it has been impossible to obtain good cut results.

More specifically, when it is desired to cut such a high melting-point and reflection-factor material as aluminum or copper with use of the conventional laser-beam processing machine, there has occurred such a disadvantage that a part or so called dross of the cutting material melted during the cutting operation will be abruptly cooled during its flow from the front side of the material to the rear side thereof and accordingly be increased in viscocity, which results in that the dross adheres to the rear face of the cutting material, thus disadvantageously involving the imcompleted cutting of the material or providing a rough cut surface thereto due to the dross.

In addition, the prior art laser-beam processing machine has had such a problem that, when it is desired to process a material of a high reflection factor with use of such a prior art machine, part of a laser beam reflected on the high-reflection-factor material enters a laser oscillator part, which sometimes causes the damage of the laser oscillator.

In view of such defects in the prior art as mentioned above, it is an object of the present invention to provide a laser-beam cutting method and system which can sharply and finely cut such materials having high melting points and high reflection factors such as aluminum or copper with use of a laser beam.

DISCLOSURE OF INVENTION

In accordance with the present invention, a laser beam is arranged to be converged upon or in the vicinity of the rear surface of a material to be processed while the pressure of an assist gas is set to be higher than a conventional one.

More specifically, the present invention is directed to providing a laser beam processing method in which a laser beam is irradiated at a portion of a material to be cut while an assist gas is blown against the laser-beam irradiating portion to thereby cut the cutting material off, and which is characterized in that the laser beam is converged upon or in the vicinity of the rear surface of the cutting material and the pressure of the assist gas is set to be higher than 6 $Kg/cm^2$.

Since the laser beam is converged upon or in the vicinity of the rear surface of the cutting material, the dross flowing from the front side of the cutting material to the rear side thereof can be prevented from being abruptly cooed. Further, since the pressure of the assist gas is set to be higer than 6 $Kg/cm^2$ and thus the dross can be effectively blown away, the cutting operation can be prevented from becoming incompleted and the cutting face can be also prevented from becoming rough.

The present invention is arranged so that light reflected on the cutting material is partly extracted through a beam splitter and so that, when the extracted reflected light exceeds a predetermined level, the power of the irradiating laser beam is reduced or the feeding movement of the cutting material relative to the laser beam is stopped.

BRIEF DESCRIPTION OF DRAWINGS

FIG. 1 is a shematic diagram for explaining the cutting principle of a laser processing machine;

FIG. 2, (a) and (b) show diagrams showing focused positions of a laser beam in piercing and cutting operations, respectively;

BEST MODE FOR CARRYING OUT THE INVENTION

Figure 3:
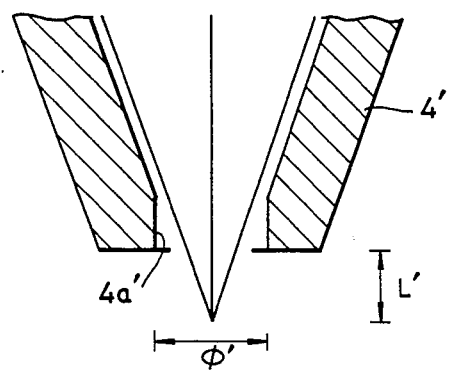
FIG. 3 is a cross-sectional view of a part of an arrangement of a art nozzle.

An embodiment of the present invention will be explained by referring to the accompanying drawings.

When it is desired to cut such a material 1 as shown in FIG. 1 with use of a laser-beam processing machine, a laser beam emitted from a laser oscillator (not shown) is directed to the cutting material 1 through a reflecting mirror 2 and a condensing lens 3, and at the same time, an assist gas 5 is directed from the tip end of a nozzle 4 toward the cutting point of the cutting material 1, i.e., is blown thereagainst.

When the cutting material 1 is made of such a material having a high melting point and a high reflection factor as aluminum or copper, however, it has been impossible for the prior art method to obtain good cut results a has been mentioned earlier.

To overcome such a defect, in accordance with the present invention: (A) The laser beam is converged upon or in the vicinity of the rear surface of the cutting material. (B) The assist gas is set to be high (between 10 and 20 $Kg/cm^2$). A nitrogen ($N_2$) gas has been used as the assist gas in the present embodiment, but other suitable gas such as argon (Ar) gas may be also employed as the assist gas.

Prior to performing the cutting operation under the aforementioned processing conditions, a so-called piercing operation (starting-hole making operation) is first carried out. More in detail, a starting hole is made at a cut starting point on the cutting material 1 by convergting the laser beam upon the cut starting point thereon.

During the piercing operation, the pressure of the assist gas is set to be low in order to prevent the scattering of part of the material fused by the laser beam and blown by the assist gas.

After the completion of the above piercing operation, the cutting operation is carried out under the aforementioned processing conditions.

More specifically, a nozzle 4 is moved down so that the laser beam is focused on or in the vicinity of the lower surface of the cutting material 1 as shown in FIG. 2(b) And the pressure of the assist gas to be blown against the cutting point is switched to a higher one (between 10 and 20 Kg/cm$^2$) and the cutting material 1 is moved in its cutting direction.

It has been confirmed according to the foregoing embodiment that such materials of high melting points and high reflection factors can be highly favorably cut off.

It goes without saying that, when the cut starting point is located at an end of the cutting material, the aforementioned piercing operation can be eliminated.

The piercing time, which varies depending on the thickness of the cutting material 1, is set by a suitable timer. It is also possible as a matter of course to dispose a light sensor at the lower side of the cutting material 1 to detect the termination of the piercing operation.

The above-mentioned processing procedure may be fully automatically executed under control of an NC (numerical control) program.

When the cutting operation is carried out by converging the laser beam upon the cutting material as in the prior art, a distance L' between the tip end of a nozzle 4' and the focused point of the laser beam can be made short as shown in FIG. 3. Accordingly, it has been possible to make large the ratio of the length of a straight portion of the nozzle tip end with respect to the diameter $\phi'$ of an opening of the nozzle 4' and therefore to effectively condense the assist gas on the cutting point.

Figure 4:
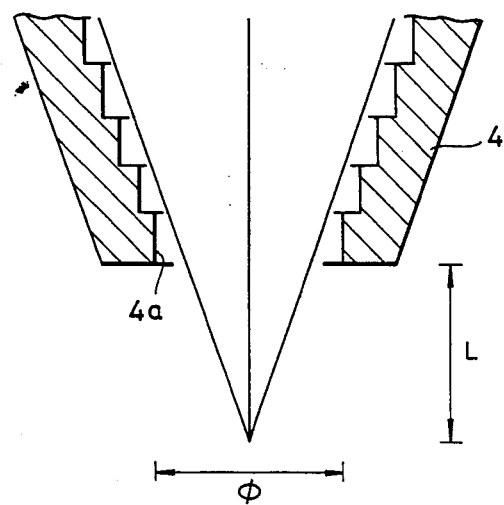
FIG. 4 is a cross-sectional view of a part of an arrangement of a nozzle used in an embodiment of the present invention.

However, when it is desired to converge or focus the laser beam on or in the vicinity of the rear surface of the cutting material 1 as in the foregoing embodiment, the diameter $\phi$ of an opening of the nozzle 4 must be made large as shown in FIG. 4.

That is, taking the thickness of the cutting material 1 into consideration, it is necessary to make large a distance L between the nozzle 4 and the beam focusing point.

The larger the opening diameter $\phi$ is the smaller the ratio of the straight portion with resect to the opening diameter $\phi$ is, which disadvantageously result in that the assist gas is scattered from the tip end of the nozzle 4. To avoid this, in this embodiment, the inner peripheral surface of the nozzle 4 is stepwise (in section) formed to be a staircase as shown in FIG. 4.

With this nozzle 4, the formation of a plurality of straight portions in the nozzle enables the substantial enlargement of the ratio of the straight portions with respect to the opening diameter $\phi$, whereby the assist gas can be effectively converged upon the cutting point.

Although the pressure of the assist gas during the cutting operation of the cutting material has been set to be between 10 and 20 Kg/cm$^2$ in the foregoing embodiment, the gas pressure may be set to be at least 6 Kg/cm$^2$ with good cut results.

Figure 5:
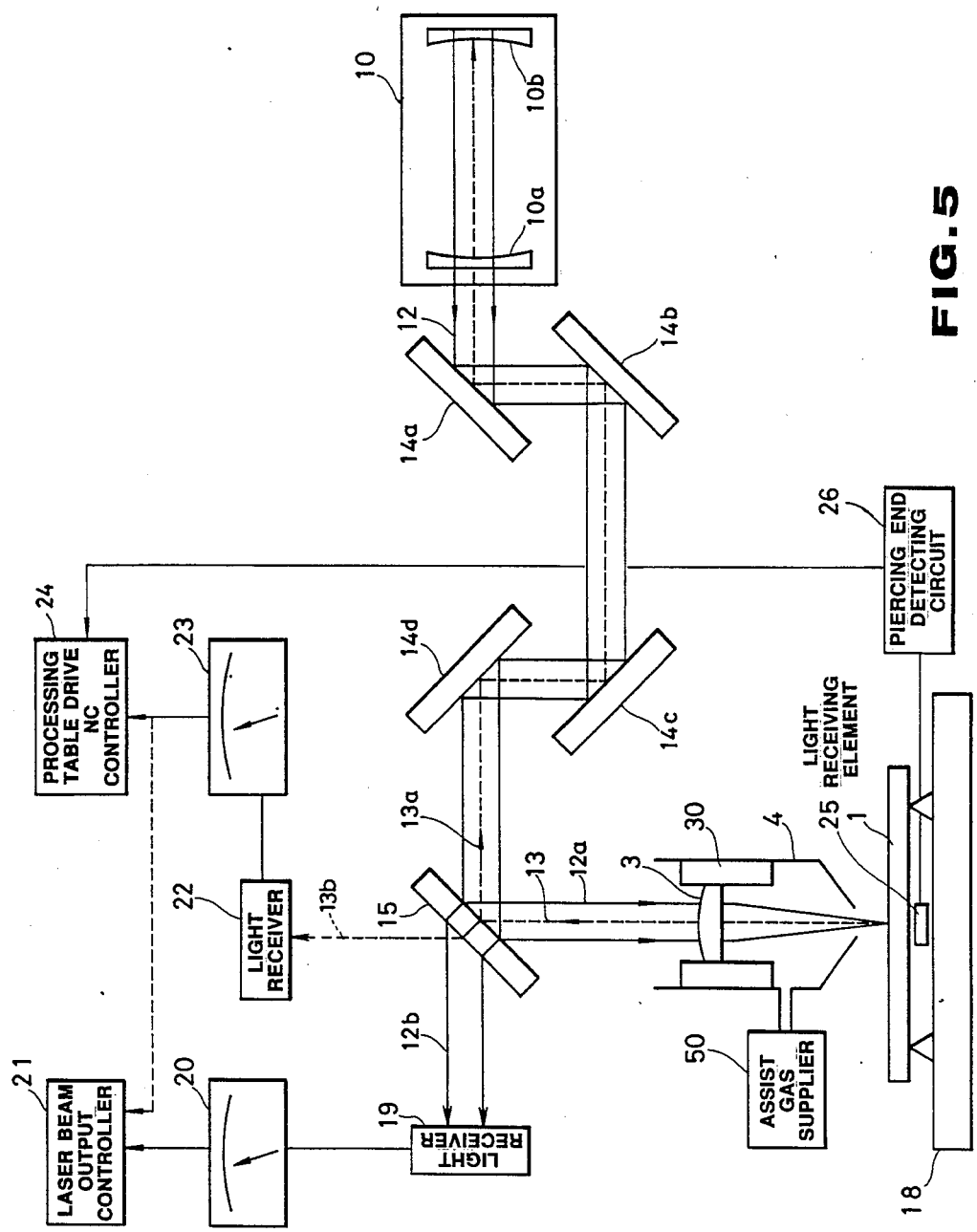
FIG. 5 is a block diagram showing an embodiment of the present invention.

Shown in FIG. 5 is an embodiment of the present invention in which a laser obscillator 10 has an output mirror 10a and a reflecting mirror 10b incorporated therein.

Refractive mirrors 14a to 14d are disposed between the laser oscillator 10 and a processing table 18.

A beam splitter 15 is provided close to a condensing lens 3.

The processing table 18 is arranged to be moved in forward and backward directions and leftward and rightward directions by an NC driving device (not shown), and the table holdes on its upper side a material 1 to be processed which in turn is disposed close to the condenser 3.

The processing table 18 may be arranged to grip end portions of the processing material and the movement of the table may be limited only to the forward and backward directions or only to the left and right directions.

Such an assist gas as a nitrogen (N$_2$) gas is introduced from an assist-gas supplier 50 into a nozzle 4 and then blown toward the processing material 1 from the tip end of the nozzle 4. The pressure of the assist gas is kept to be lower than 6 Kg/cm$^2$ in the piercing operation and to be higher than 6 Kg/cm$^2$ in the cutting operation under control of the assist-gas supplier 50.

The lens 3 is arranged to be movable in its axial-axis direction. That is, the position of the lens 3 is controllably moved under control of a lens driving mechanism 30 so that the laser beam is focused on the front surface of the processing material 1 during the piercing operation and focused on the rear surface of the material 1 during the cutting operation.

A light receiving element 25, which is disposed under the rear side of the processing material 1, functions to detect the end of the piercing operation. A piercing-end detecting circuit 26 detects a light reception output of the element 25 and sends its detection output to a processing-table drive NC controller 24 to thereby drive the processing table 18 and start the cutting operation of the processing material 1.

Light receivers 19 and 22 are disposed close to the beam splitter 15 to be connected via power meters 20 and 23 to a laser-beam output controller 21 and to the processing-table drive NC controller 24, respectively.

A laser beam 12 oscillated at the laser oscillator 10 through the reflecting mirror 10b and the output mirror 10a is guided to the beam splitter 15 through the plurality of refractive mirrors 14a to 14d.

Since the beam splitter 15 is set to, for example, have a reflection factor of 97% and a light transmission factor of 3%, 97% of the laser beam 12 is condensed by the condenser 3 in the form of a reflected beam 12a and then irradiated on the front surface of the processing material 1.

The remainder 3% of the laser beam 12, on the other hand, is passed through the beam splitter 15 and received at the light receiver 19 as a transmitted beam 12b, which receiver 19 in turn generates an output signal according to the transmitted beam 12b of the beam splitter 15 and sends it to the power meter 20. The meter 20 indicates the output of the laser beam 12 on the basis of the output signal of the receiver 19 and inputs its output signal to the laser-beam output controller 21, which controller in turn compares the received signal with the level of a signal corresponding to the set output and controls to hold the set output.

97% of a material-reflected beam 13 reflected on the surface of the processing material 1 is bent at a right angle by the beam splitter 15 as a material reflected beam 13a, passed through the refractive mirrors 4d to 4a, and fed back into the laser oscillator 10 so that part of the feed-back beam 13a corresponding to the light transmission factor of the output mirror 10a (that is, transmitted through the output mirror 10a) is combined with the original laser beam within the oscillator to increase the beam output of the oscillator and the increased output beam of the oscillator is added to the remainer of the feed-back beam 13a (that is, not transmitted through or reflected by the output mirror 10a), guided along the same optical path as the laser beam 12 and again irradiated on the processing material 1. The re-guided beam from the refractive mirrors partly reaches the light receiver 19 through the beam splitter 15. The part beam reaching the light receiver 19 acts to increase the output signal of the light receiver 19 which in turn applies its increased output to the laser-beam output controller 12. The controller 12 compares the increased output with the level of the signal corresponding to the set output and controls to reduce the laser beam output of the laser oscillator 10. Such operation is repeated to maintain the laser beam output of the laser oscillator 10 at a constant level.

97% of the material reflected beam 13 is reflected by the beam splitter 15 as the material reflected beam 13a and then fed back to the laser oscillator, while the remaining 3% of the material reflected beam 13 is passed through the beam splitter 15 and applied to the light receiver 22 as a materialreflected and splitter-transmitted beam 13b, so that the light receiver 22 generates an output signal corresponding to the material-reflected and splitter-transmitted beam 13b and sends it to the power meter 23 to indicate the output of the material-reflected beam 13 on the basis of the output signal of the power meter. An output of the power meter 23 is further sent to the material-table drive NC controller 24 so that, when the reflected beam 13 exceeds a constant predetermined level, the table drive NC controller 24 stops the movement of the material as an emergency, thereby preventing any damage of the laser oscillator.

Although the invention has been arranged in the foregoing embodiment so that, when the power of the reflected beam exceeds the predetermined level, the movement of the material is stopped as an emergency, the invention may be also arranged as shown by a dotted line in FIG. 5 so that the output of the power meter 23 is applied to the laser-beam output controller not to emergency-stop the movement of the material but to lower the power of the laser beam as the output of the laser oscillator 10.

INDUSTRIAL APPLICABILITY

In accordance with the present invention, such materials having high melting point and high reflection factors as aluminum or copper can be properly cut, while any damage of a laser oscillator caused by light reflected on such materials can ber prevented.

I claim:

1. A laser beam processing method in which a laser beam is irradiated at a portion of a material to be cut while an assist gas is blown against said laser-beam irradiating portion to thereby cut said cutting material off; said method being characterized in that said laser beam is converged upon or in the vicinity of a rear surface of the cutting material and a pressure of said assist gas is set to be higher than 6 Kg/cm$^2$.

2. A laser beam processing method as set forth in claim 1, wherein an N, gas is used as said assist gas.

3. A laser beam processing method as set forth in claim 1, wherein the pressure of said assist gas is set to be between 6 and 20 Kg/cm$^2$.

4. A laser beam processing method in which a laser beam is irradiated at a portion of a material to be processed while an assist gas is blown against said laser-beam irradiating portion to thereby cut said processing material off, said method being characterized by comprising:

the piercing step of making a starting hole in said processing material under conditions that said laser beam is converged upon or in the vicinity of a rear surface of the processing material and a pressure of said assist gas is set to be higher than 6 Kg/cm$^2$; and the cutting step of cutting the processing material under conditions that the laser beam is converged upon or in the vicinity of the rear surface of the processing material and the pressure of said assist gas is set to be a second predetermined level that is higher than 6 Kg/cm$^2$.

5. A laser beam processing system comprising:
means for generating a laser beam;
optical means for converging said laser beam generated at said laser beam generating means upon or in the vicinity of a rear surface of a material to be cut;
means for supplying an assist gas having a high pressure of 6 Kg/cm$^2$ or more;
a nozzle for blowing said high-pressure assist gas sent from said assist-gas supplying means against a portion of said material to be irradiated; and
means for moving said laser beam or said cutting material at a predetermined speed to scan the laser beam generated at said laser beam generating means along a predetermined cutting line.

6. A laser beam processing system as set forth in claim 5, wherein said optical means includes a lens which is resistive to high pressures and which is disposed to be moved in a direction of an optical-axis of said lens.

7. A laser beam processing system as set forth in claim 5, wherein said nozzle is provided in its inner peripheral surface with a staircase which has a plurality of straight portions, in section, extended in said optical-axis direction, and a ratio of said straight portions with respect to a diameter of an opening of the nozzle is set to be substantially large.

8. A laser beam processing system comprising:
means for generating a laser beam;
means for changing a convergence position of said laser beam generated at said laser beam generating means;
means for selectively supplying an assist gas having a first low pressure that is lower than 6 Kg/cm$^2$ and an assist gas having a second high pressure that is higher than 6 Kg/cm$^2$;
a nozzle for blowing said assist gas of the high pressure sent from said assist-gas supplying means against a portion of a material to be cut and for the laser beam to be irradiated; and
means for controlling movement of the laser beam or said material to stop the laser beam generated at the laser-beam generating means at a predetermined piercing position and then to scan the laser beam along a predetermined cutting line.

9. A laser beam processing system comprising:
means for generating a laser beam;

means for irradiating the laser beam generated at said laser-beam generating means on a portion of a material to be cut;

optical means for converging said laser beam generated at said laser beam generating means upon or in the vicinity of a rare surface of the material to be cut;

means for supplying an assist gas having a high pressure of 6 Kg/cm$^2$ or more;

a nozzle for blowing said high-pressure assist gas sent from said assist-gas supplying means against a portion of the material to be irradiated;

means for moving said laser beam or said cutting material at a predetermined speed to scan the laser beam generated at said laser beam generating means along a predetermined cutting line;

a beam splitter for separately extracting part of the laser beam reflected on said material;

sensor means for detecting a level of said laser beam part extracted through said beam splitter; and means for reducing power of the laser beam output of said laser-beam generating means when said level of the laser beam part detected by said sensor means exceeds a predetermined value.

10. A laser beam processing system comprising: means for generating a laser beam; means for irradiating the laser beam generated at said laser-beam generating means on a portion of a material to be cut;

optical means for converging said laser beam generated at said laser beam generating means upon or in the vicinity of a rare surface of the material to be cut;

means for supplying an assist gas having a high pressure of 6 Kg/cm$^2$ or more;

a nozzle for blowing said high-pressure assist gas sent from said assist-gas supplying means against a portion of the material to be irradiated;

a beam splitter for separately extracting part of the laser beam reflected on said material;

sensor means for detecting a level of said laser beam part extracted through said beam splitter;

means for moving the laser beam or said cutting material at a predetermined speed to scan the laser beam generated at said laser-beam generating means aloang a predetermined cutting line; and means for emergency-stopping movement of the laser beam or the material caused by said moving means when said level of the laser beam part detected by said sensor means exceeds a predetermined level.

* * * * *